United States Patent [19]

Brugger

[11] 4,178,516
[45] Dec. 11, 1979

[54] MOLD READER

[75] Inventor: Richard D. Brugger, Erie, Pa.

[73] Assignee: Ball Corporation, Muncie, Ind.

[21] Appl. No.: 854,894

[22] Filed: Nov. 25, 1977

[51] Int. Cl.$^2$ .............................................. G06K 7/10
[52] U.S. Cl. ............................... 250/566; 250/223 B; 250/227
[58] Field of Search .................. 250/216, 223 B, 227, 250/567, 568; 356/240; 340/146.3 G

[56] References Cited

U.S. PATENT DOCUMENTS

| | | | |
|---|---|---|---|
| 3,104,324 | 9/1963 | Rabinow | 250/227 |
| 3,167,741 | 1/1965 | Brown | 340/146.3 |
| 3,167,744 | 1/1965 | Rabinow | 340/146.3 G |
| 3,225,329 | 12/1965 | Rabinow | 340/146.3 |
| 3,252,140 | 5/1966 | Le May et al. | 340/146.3 G |
| 3,301,396 | 1/1967 | Benson et al. | 209/72 |
| 3,313,409 | 4/1967 | Johnson | 209/73 |
| 3,517,386 | 6/1970 | Jones | 340/146.3 |
| 3,571,796 | 3/1971 | Brugger | 340/146.3 |
| 3,644,889 | 2/1972 | Skenderoff et al. | 250/567 |
| 3,651,937 | 3/1972 | Kronseder | 250/223 B |
| 3,745,314 | 7/1973 | Mathias et al. | 250/223 B |
| 3,770,969 | 11/1973 | Anseven et al. | 356/240 |
| 3,923,158 | 12/1975 | Fornaa | 209/75 |
| 3,974,378 | 8/1976 | Brugger | 250/227 |

Primary Examiner—David C. Nelms
Attorney, Agent, or Firm—Gilbert E. Alberding

[57] ABSTRACT

Apparatus for reading an alphanumeric code molded into the bottom of a glass container. The code characters are sequentially illuminated, and a plurality of images of the illuminated character are formed in a given plane. An optical mask is disposed in a given plane, having thereon at least one character corresponding to each possible character in the code. The mask characters are respectively aligned with one of the plural images and are opposite contrast to the image. The image of the illuminated character is formed on one face of a bundle of small diameter optical fibers, the ends of which are cut in common planes and polished. The image passed by the optical fiber bundle is received by a large diameter lens projecting the image to infinity, and a plurality of small diameter lenses in hollow opaque tubes are interposed between the large diameter lens and the mask to provide the plural images. Provisions for indicating the sequence of the code characters and for manufacturing a suitable optical mask are also disclosed.

16 Claims, 7 Drawing Figures

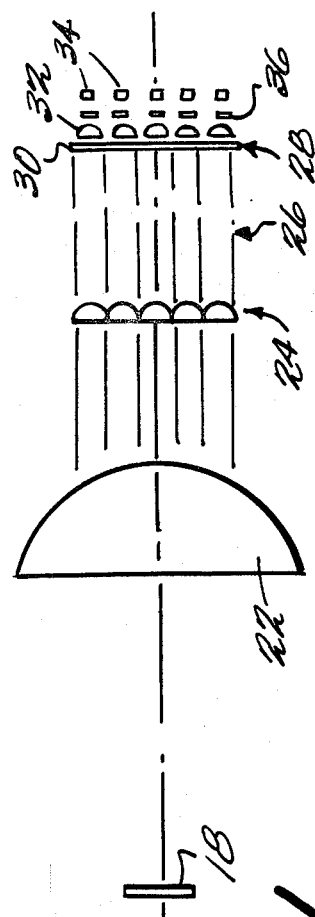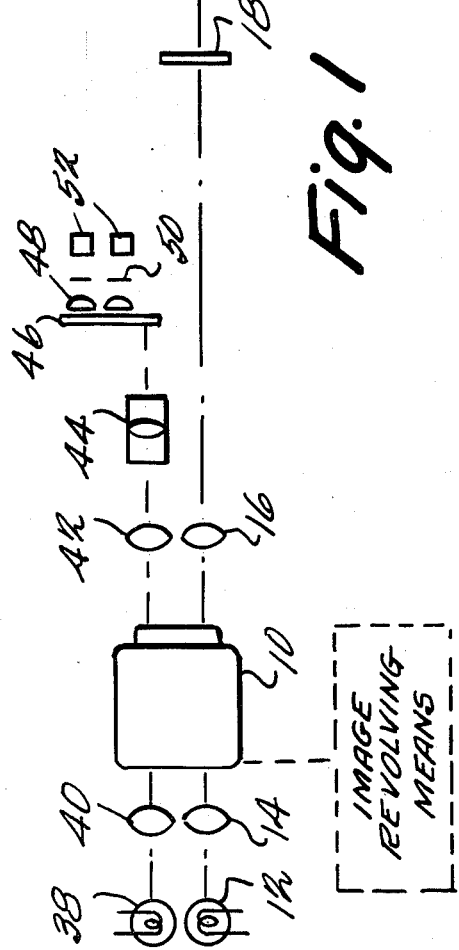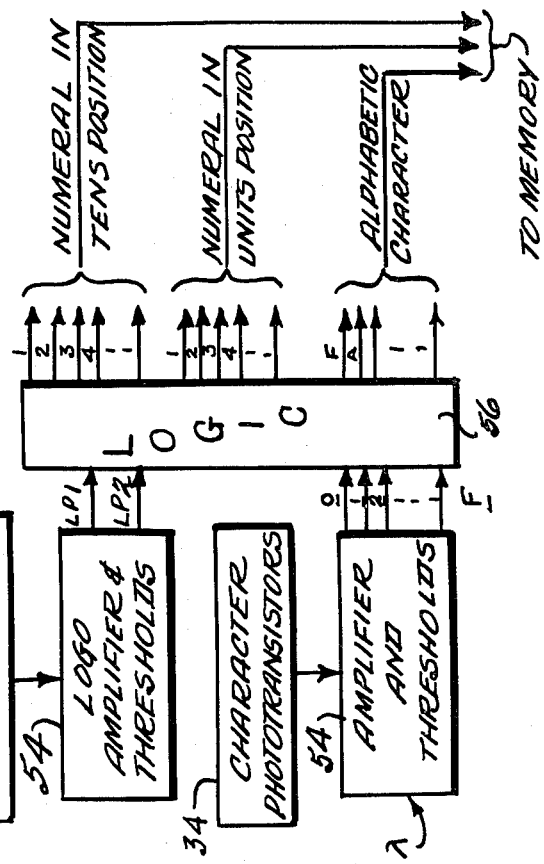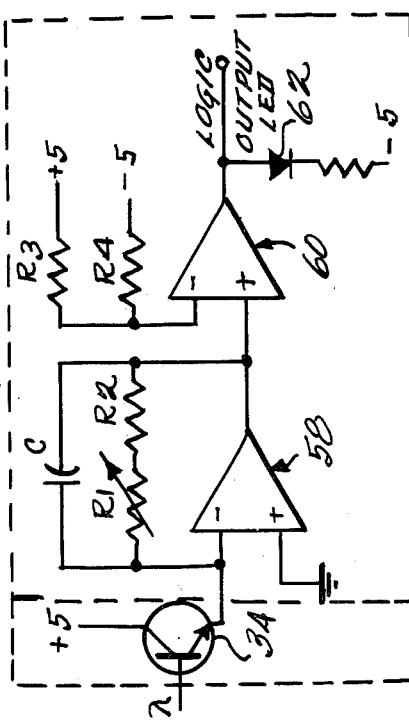
Fig. 1
Fig. 2
Fig. 3

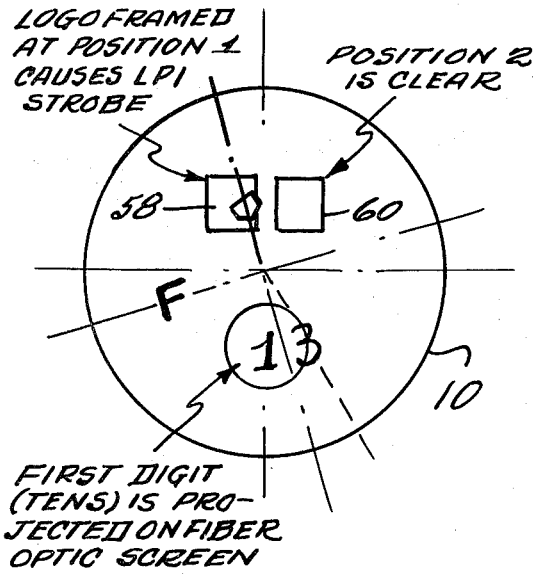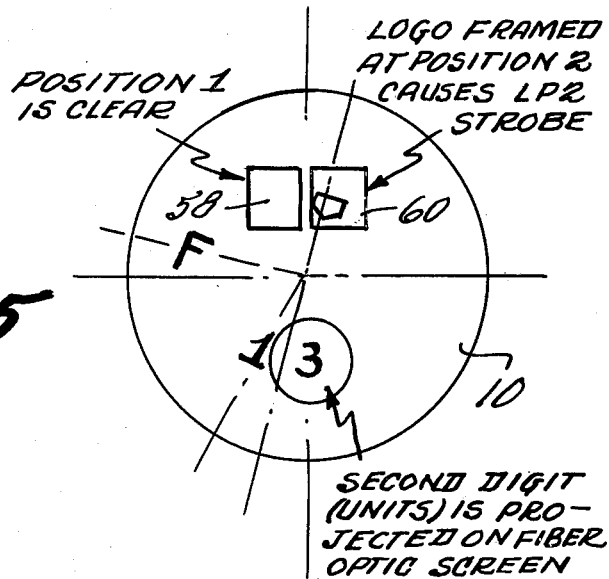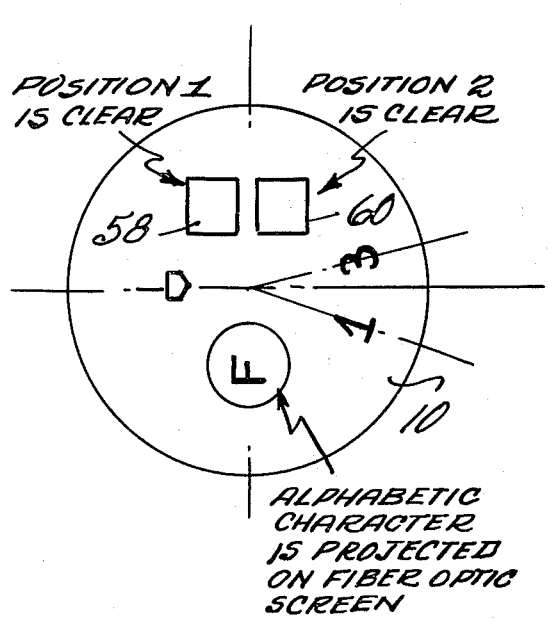

MOLD READER

In production of molded glass containers, optical systems for detecting faults or dirt in the containers are well known. Examples of such bottle inspection systems are described in U.S. Pat. Nos. 3,313,409 issued 1967 to Johnson, 3,651,937 issued 1972 to Kronseder, 3,770,969 issued 1973 to Ansevin et al, and 3,974,378 issued 1976 to Brugger et al.

It is often desirable to ascertain the particular mold producing individual container in that various types of defects are mold related and tend to recur in the containers produced by the mold. Accordingly, a code indicative of the particular mold is commonly molded into the bottom of the container.

Classically, non-alphanumeric codes, such as binary "bumps", have been utilized in view of the difficulty in reading alphanumeric codes electronically. Examples of such non-alphanumeric-type code reading systems are described in U.S. Pat. Nos. 3,301,396 issued to Benson et al in 1967, 3,745,314 issued 1973 to Mathias et al and 3,923,158 issued 1975 to Fornaa. Non-alphanumeric codes, however, are not readily readable by a human operator or inspector. Accordingly, it is desirable to have an electronic system for automatically reading alphanumeric codes.

Pattern recognition systems of the type which project an unknown pattern against optical masks corresponding to stored master patterns, measure the light passed through each mask, and then determine the identity of the unknown pattern by noting which master pattern best correlates to the projected image are generally well known. Examples of such systems are described in U.S. Pat. Nos. 3,104,324 and 3,225,329, respectively, issued 1963 and 1965 to Rabinow, 3,167,741 issued 1965 to Brown, 3,252,140 issued 1966 to Lemay et al and 3,517,386 issued 1970 to Jones. Such systems, however, have not generally been employed for reading mold codes in glass containers.

The present invention provides an accurate and relatively inexpensive mechanism for electronically reading alphanumeric indicia of the mold producing a glass container. The container is rotated such that the characters of the code are sequentially illuminated. A plurality of images of the illuminated character are generated and projected on an optical mask having at least one character corresponding to each possible code character. The mask characters are of opposite contrast to the code character image, and are respectively aligned with one of the images. The light passed through the respective mask characters is measured to correlate the illuminated code character and mask character. Correlation between the mask characters and code characters is insured by utilizing a mask formed by selectively exposing portions of a photographic negative or plate in situ to project images from samples of the molded codes.

A preferred exemplary embodiment of the present invention will hereinafter be described with reference to the appended drawings wherein like numerals designate like elements and:

FIG. 1 is a block schematic of an optical reader in accordance with the present invention;

FIG. 2 is a block diagram of the processing circuitry;

FIG. 3 is a schematic of a suitable electro-optical channel circuitry;

Figure 7:
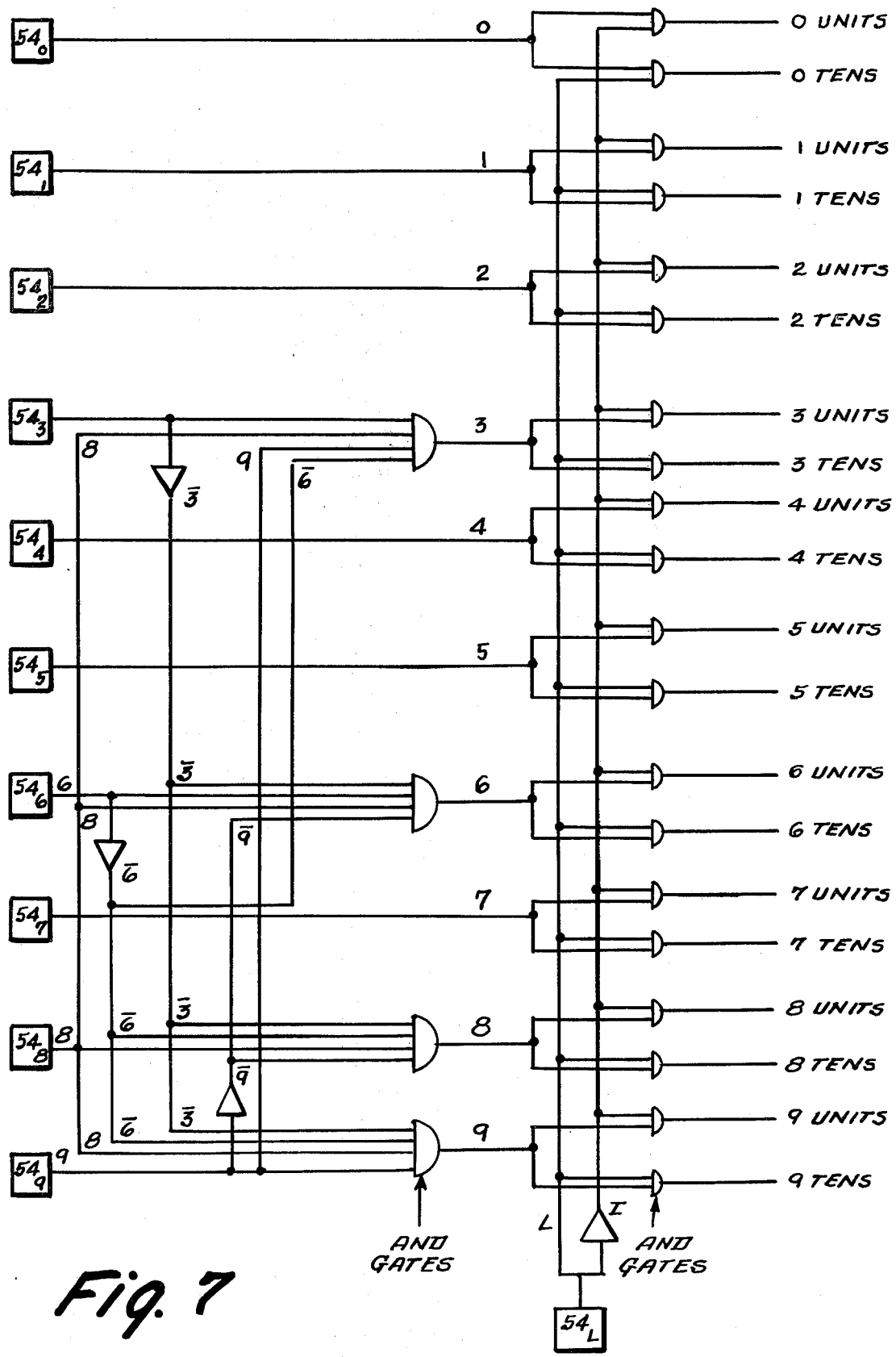

FIGS. 4 5, and 6 illustrate the reading of a sequential code; and

FIG. 7 is a block schematic diagram of suitable logic circuitry for a two digit numerical code.

The presently preferred exemplary embodiment of the present invention to be hereinafter described is adapted for reading a three digit alphanumeric code on the bottom of, for example, a baby food jar, indicative of the mold wherein the particular jar was formed. The code digits are preferably integral to the mold, and are formed a predetermined radial distance from the outer side wall of the jar. Also, integral to the mold is a marker or indicia, such as a company logo, disposed such that it appears at a predetermined angular disposition with respect to the individual code characters.

The presently preferred exemplary embodiment is utilized as part of an on-line inspection station, and bottles are conveyed, by means well known in the art, to the inspection station where the mold code is read.

Referring now to FIG. 1, an individual bottle 10 is positioned in the reader, and disposed for spinning about its central axis. A lamp 12, suitably a compact high intensity filament-type lamp, such as an incandescent or quartz-iodine lamp, and a lens 14 illuminate a region on the bottom of jar 10 at a radial distance from the side wall corresponding to the radial position of the code. Lamp 12 and lens 14, in effect, place the image of the filament of lamp 14 on the plane of a further lens 16. It should be appreciated that the scanning of the light on the bottom of jar 10 can be effected optically, as by synchronously rotating dove prisms disposed on the optical axis on either side of jar 10 between lenses 14 and 16. Lens 16 images the illuminated portion of the jar bottom onto a face plate 18 suitably formed of an optical fiber bundle. The fiber bundle is suitably formed of a large multiplicity of small diameter glass fibers, closely packed then cut and polished at both ends to form the face plate 18. Fiber optic face plate 18 operates to provide diffusion with uniform off axis viewing, as will be explained. The image passed by face plate 18 is operated upon by a large diameter long focal length lens 22 which optically projects the image to infinity. A plurality of small diameter lenses 24 are disposed in respective hollow opaque tubes 26, operating to form a plurality of identical images at a common predetermined focal plane 28. An optical mask 30 is disposed in focal plane 28 having a plurality of characters, at least one of which corresponds to each possible code character. Each mask character is disposed to receive light transmitted through one of the respective tubes 26. The light transmitted by each mask character is captured by a respective lens 32 and directed to a respective phototransistor 34 by a respective negative focal lens 36. Lens 36 collimates the converging light rays from lens 32 for optimum coupling to phototransistor 34. A code character on the jar bottom is thus imaged a multiplicity of times, each image processed in parallel by an array of mask characters, and the resulting light converted into an electrical signal for each individual optical path.

As noted above face plate 18 operates to provide uniform off axis viewing and to filter out artifacts of the lamp geometry. Since a plurality of images are to be formed, it is desirable that a high quality image be observed by lens 22 on the back face of face plate 18 over a relatively wide angle from the principal optical axis. However, since as a practical matter, the optical system (lenses 14, 16) for projecting the image of the character on the front of face plate 18 must, for example, be projected through the neck of bottle 10, the angle from the central to meridional rays must be small. Thus, if the image passed by lens 16 were projected directly to lens 22, only a few secondary images would be developed at mask 30. Further, the image would be of poor quality and would in all probability include artifacts due to the characteristics of the light source (filament). A piece of frosted glass can be utilized as face plate 18, but off axis viewing is relatively uneven (as compared to a fiber optic face plate) causing the various secondary images to differ from each other and possibly deleteriously affecting correlation. Further, transmission loss of the light through the frosted glass can be appreciable.

Face plate 18 is preferably formed from a bundle of a large number of small diameter optical fibers disposed in parallel, with faces cut normal to the fiber axes and polished. Optical fiber conducts light along its length from one end to the other, by means of multiple internal reflections from the walls. The index of refraction of the core (central part of the fiber) and the index of refraction of the cladding (material surrounding the core) determine the numerical aperature (N.A.) of the fiber. That is, a ray of light traveling down the fiber will exit the fiber within some definable angle from the normal to the exit face of the fiber. N.A. is equal to the sine of the half-angle of the exit cone. Thus, a fiber with a large N.A. provides a large exit cone. An observer can thus be farther off-axis and still see the light. Therefore, a high N.A. fiber is used to improve the off-axis viewing characteristics. Where many fibers are disposed parallel, and their diameters are very small, an image on the first side is readily viewed from the second side, with little transmission loss. The fiber bundle may be of any length, so long as the fibers are coherent. However, in view of the present cost of optic fibers, a thin slice or wafer of the bundle is preferred.

Thus, a fiber optic face plate provides a larger number of sharper and more uniform secondary images. Further, the secondary images are brighter with greater uniformity of intensity and more contrast of black to white areas. In addition, it has been found that a fiber optic face plate reduces effect of character of the filament source appearing in the multiple secondary images.

A second light source 38, and lens 40 are disposed to illuminate a region of the bottom of jar 10 at an angular disposition with respect to source 12 and lens 14 corresponding to the relative angular disposition of the framing or strobe mark (logo) and code characters. Lenses 42 and 44 are provided to project the real image on a second mask 46. Mask 46 suitably includes characters corresponding to the logo or frame mark, at relative angular dispositions corresponding to the relative angular dispositions of the respective code characters, for example, 30° apart. Lenses 48 and 50 similar to lenses 32 and 36, capture the light transmitted by the respective mask characters and focus the light of the respective phototransistors 52.

Referring now to FIG. 2, the output signals from each phototransistor 34 and 52 are applied through suitable amplifiers and threshold comparators 54 to produce a logic output signal indicative of whether or not the image code character correlates with the respective mask characters associated with the individual phototransistors. Suitable amplifiers and threshold circuitry, associated with a given electro-optical channel will hereinafter more fully be described in conjunction with FIG. 3. As will be more fully explained, the mask characters are preferably of opposite contrast, that is negative images of the imaged character. Thus, in the case of perfect correlation between a mask character and the projected image no light would pass through the mask into the light collection optics (the associated phototransistor 34 or 52). Accordingly, when the light impinging upon the photoresistor is below a predetermined threshold value, the electro-optical channel produces a logic high output.

It should be appreciated that various characters will correlate well with more than one mask character. For example, the character "3" will often correlate with both the "3" and "8" mask characters at the same time. However, an "8" character will correlate only with an "8" mask character. Accordingly, the output signals of the various electro-optical channels are applied to suitable combinational logic 56. Logic 56 will more fully be described in conjunction with FIG. 7. The logo logic signals are utilized to indicate the sequence of the digits of the code, as will be explained.

Referring now to FIG. 3, there is shown suitable circuitry 54i associated with a given phototransistor 34i. An operational amplifier 58 having an adjustable gain, amplifies the output signals of phototransistor 34i. The amplified signals are applied to an operational amplifier comparator 60 having a preset threshold value. Visual indicia such as an LED 62 may also be provided. Comparator 60 provides a logic high output signal when the amplified output signal from phototransistor 34i drops below a predetermined minimum. The output signal of comparator 60 is otherwise at a low logic level.

As noted above, bottle 10 is disposed for rotation about its central axis. FIGS. 4-6 show schematically a chronological sequence of the areas of the bottom of bottle 10 imaged on masks 30 and 46. The logo, or framing mark, is utilized to determine the sequence of the code characters. Assuming the code to be three characters in length, mask 46 bears characters at positions corresponding to the respective positions of the logo when two of the three characters are respectively illuminated by light source 12. Accordingly, the projected image of the logo is correlated with a first mask 46 character 58 simultaneously with the projection of a predetermined one, for example, the second character in the code on mask 30 as illustrated in FIG. 4. Similarly, as illustrated in FIG. 5, the logo correlates with mask 46 character 60 simultaneously with the projection of the next succeeding digit character on mask 30. Combinational logic 56 can thus provide an indication of the sequence of the code characters. In general it is preferred to use N-1 framing positions for an N character code. It should be appreciated, however, that even a single correlation of the logo or other framing mark can be utilized to determine the sequence of the code. However, provision of a direct indication of the code in sequence in such instance would then require substantially more complex logic than in the instance where N-1 positions correlations are performed.

Referring now to FIG. 7, there is shown exemplary combinational logic for a system utilizing a two digit numerical code. For the purposes of illustration, it is assumed that mask 46 bears only a single logo character in a position corresponding to the tens digit of the code. It is noted that with respect to the 3, 6, 8 and 9 numerals, erroneous initial correlations can occur. Accordingly, the output signals of the respective electro-optical channels $54_3$, $54_6$, $54_8$ and $54_9$ corresponding to the 3, 6, 8 and 9 characters on mask 30 are gated to provide true correlation indications. More specifically, a "3" code character is indicated upon concurrence of high logic signals from the $54_3$, $54_8$ and $54_9$ channels with a low logic level signal from the $54_6$ channel. Similarly, high logic level signals from the $54_6$ and $54_8$ channels concurrently with low logic level signals from the $54_3$ and $54_9$ channels in indicative of a "6" code character, high logic level signals from the $54_8$ and $54_9$ channels concurrently with low logic level signals from the $54_3$ and $54_6$ channels is indicative of a "9" code character, and a high logic level signal from channel $54_8$ concurrently with level logic signals from channels $54_3$, $54_6$ and $54_9$ indicates projection of the code character "8". The respective signals indicative of the projection of the numerals are AND gated with the output signal from the electro-optical channel associated with the logo character in mask 46, to indicate whether the projected character is in the tens or units position.

It should be appreciated, that logic for a two digit numeric code is shown for purposes of ease of illustration, and that the system can easily accommodate codes of three or more digits, and alphanumeric or symbolic characters. In the case of an alphabet code, the letters B, D, E, F, L, P and R may require logic correlation steps analogous to those used for numerals 3, 6, 8 and 9.

In accordance with another aspect of the present invention, it is particularly advantageous to form the masks in situ from projected images of actual molded characters to insure proper correlation to the mold code characters. A photographic negative or plate of, for example, high gamma film, is disposed in plane 28. All tubes 26 but one are blocked and the image of a selected character is projected onto and exposes a selected segment of the photographic negative. The process is repeated blocking all but a different tube 26 for each individual code character. The resulting negative is developed as a unit and is replaced, keyed to its position during the exposure process.

It will be understood that the above description is of illustrative embodiments of the present invention, and that the invention is not limited to the specific forms shown. Modifications may be made in the design and arrangement of the elements without departing from the spirit of invention as expressed in the appended claims.

What is claimed is:

1. Apparatus for reading a code character from a non-opaque object, comprising:
    means for illuminating the region of said object bearing said character;
    means, including a plurality of small diameter optical fibers disposed to receive an image from said character, for forming a plurality of code character images indicative of said character on a given plane;
    an optical mask disposed in said second given plane, having thereon at least one character corresponding to each possible code character image, said mask characters being respectively aligned with said images and of opposite contrast to said images;
    means for deriving respective signals indicative of the light passed through the respective ones of said mask characters; and
    logic means, responsive to said derived signals, for generating signals indicative of the presence of individual ones of said possible code characters.

2. The apparatus of claim 1 further including means for aligning said images with said mask characters.

3. The apparatus of claim 2 wherein said non-opaque object is a hollow container, has at least one character molded on the bottom thereof at a predetermined radial distance from the outer wall of the container, and wherein further:
    said means for aligning comprises means for rotating said container about its cylindrical axis.

4. The apparatus of claim 3 wherein a sequence of said characters are molded on the bottom of said container, said characters having predetermined angular dispositions with respect to a marker on the bottom of said container and wherein said means for aligning further comprises means for generating a signal indicative of when said marker moves into a predetermined position; and
    said means for electrically gating said presence signals in response to said marker position signal.

5. The apparatus of claim 1 wherein said character is also non-opaque and is formed by variations in thickness of said object, and said means for illuminating includes a light source for passing light through said object.

6. The apparatus of claim 5 wherein said object is a hollow container and said character is disposed on the bottom of said container at a predetermined radial distance from the outer wall thereof, and wherein further said apparatus includes:
    means, including means for rotating said container about its cylindrical axis for aligning said images with said mask characters.

7. The apparatus of claim 6 wherein a sequence of said characters are disposed on the bottom of said container, said characters having predetermined angular dispositions with respect to a marker on the bottom of said container and wherein said means for aligning further comprises:
    means for generating a signal indicative of when said marker moves into a predetermined position; and
    said means for electrically gating said presence signals in response to said marker position signal.

8. Apparatus for reading a character from a non-opaque object, comprising:
    means for illuminating the region of said object bearing said character;
    a plurality of small diameter optical fibers, said fibers being disposed in a parallel bundle and the ends thereof cut in common planes normal to the axes of said fibers and polished to form a face plate;
    a lens system for providing an image of said character on said face plate;
    an optical mask disposed in a given plane, having thereon at least one character corresponding to each possible character on said object;
    a further lens system including a large diameter lens and a plurality of small diameter lenses, said large diameter lens projecting the image passed by said fibers to infinity, and said small diameter lenses being disposed in respective hollow opaque tubes interposed between said large diameter lens and said mask to develop a plurality of images of the character on said mask;
    means for aligning said plurality of images with said mask characters; and
    means for deriving respective signals indicative of the light passed through the respective ones of said mask characters.

9. The apparatus of claim 8 wherein said non-opaque object is a hollow container having at least one character molded on the bottom thereof at a predetermined radial distance from the outer wall of the container, and wherein further:

said means for aligning comprises means for rotating said container about its cylindrical axis.

10. The apparatus of claim 9 wherein a sequence of said characters are molded on the bottom of said container, said characters having predetermined angular dispositions with respect to a marker on the bottom of said container and wherein said means for aligning further comprises means for generating a signal indicative of when said marker moves into a predetermined position; and said means for gating said respective mask character signals in accordance with said marker position signal.

11. Apparatus for reading a code character from a non-opaque container, comprising:

means for illuminating the region of said object bearing said character;

a wafer of small diameter optical fibers disposed in parallel with faces cut normal to the axes of said fibers and polished;

a lens system for providing an image of said character on said wafer;

an optical mask disposed in a given plane, having thereon at least one character corresponding to each possible code character;

a further lens system including a large diameter lens and a plurality of small diameter lenses, said large diameter lens projecting the image passed by said wafer to optical infinity, and said small diameter lenses being disposed in respective hollow opaque tubes interposed between said large diameter lens and said mask to develop a plurality of images of the character on said mask, said mask characters being respectively aligned with said images and of opposite contrast to said images; and means for deriving respective signals indicative of the light passed through the respective ones of said mask characters.

12. A method for making the optical mask of the apparatus of claim 11 comprising the steps of:

disposing a photographic negative in said given plane;

blocking all but one of said tubes, and illuminating a sample of a first character to expose a selected portion of said negative;

blocking all but a different one of said tubes, and illuminating a sample of a different character to expose a different portion of said negative;

repeating the immediately above step for each remaining of said characters; and developing said negative.

13. Apparatus for reading an alphanumeric code molded on the bottom of a non-opaque container, said code being disposed on said container bottom at a predetermined radial distance from the outer wall of said container and at a predetermined angular disposition with respect to an indicia on said container, comprising:

means for rotating said container about its longitudinal axis;

means for generating a signal indicative of said indicia assuming a predetermined position;

means for selectively illuminating a portion of said container bottom;

means for producing on a given plane, a plurality of images of alphanumerics molded into said illuminated portion;

an optical mask disposed in said given plane, bearing in opposite contrast to said image, at least one of each alphanumeric possible in said code, each mask alphanumeric being disposed on said given plane such that it is aligned with one of said plural images, whereby the mask alphanumeric corresponding to the illuminated code alphanumeric passes a predetermined amount of light.

14. The apparatus of claim 13 wherein said means for generating said indicia position signal comprises:

a light source;

a mask of said indicia;

means for forming the image of said indicia on said mask; and photosensitive means, responsive to light passes through said indicia mask for generating said indicia position signal when said indicia image is aligned with said mask.

15. The apparatus of claim 14 wherein said means for forming a plurality of images comprises:

a plurality of small diameter optical fibers, disposed in parallel with and the ends thereof cut in common planes normal to the fiber axes and polished to form a face plate;

a lens system for providing an image of said illuminated alphanumeric on said face plate; and a further lens system including a large diameter lens and a plurality of small diameter lenses, said large diameter lens projecting the image passed by said fibers to infinity, and said small diameter lenses being disposed in respective hollow opaque tubes interposed between said large diameter lens and said mask to develop said plurality of images of the character.

16. Apparatus for reading an alphanumeric code molded on the bottom of a non-opaque container, said code being disposed on said container bottom at a predetermined radial distance from the outer wall of said container and at a predetermined angular disposition with respect to an indicia on said container, comprising:

means for rotating said container about its longitudinal axis;

means for generating a signal indicative of said indicia assuming a predetermined position;

means for selectively illuminating a portion of said container bottom;

a wafer of small diameter optical fibers, disposed in parallel, having ends cut in common planes and polished to form the faces of said wafer;

a lens system for providing an image of said alphanumeric on said wafer;

an optical mask disposed in a given plane, bearing at least one of each alphanumeric possible in said code;

a further lens system including a large diameter lens and a plurality of small diameter lenses, said large diameter lens projecting the image passed by said fibers to infinity, and said small diameter lenses being disposed in respective hollow opaque tubes interposed between said large diameter lens and said mask to develop a plurality of images of the alphanumeric, said plural images being aligned with said mask alphanumeric, whereby the mask alphanumeric corresponding to the illuminated code alphanumeric passes a predetermined amount of light.

* * * * *